US012751475B2

(12) United States Patent
Millet et al.

(10) Patent No.: US 12,751,475 B2

(45) Date of Patent: Oct. 6, 2026

(54) PROTEIN-COMPLEXED MCT OIL, METHOD OF MANUFACTURE, AND FOOD PRODUCTS MADE THEREFROM

(71) Applicant: INNOVATIVE FLOURS, LLC, Cottonwood Heights, UT (US)

(72) Inventors: Gary Millet, Salt Lake City, UT (US); Kylin Liao, Nanjing (CN)

(73) Assignee: INNOVATIVE FLOURS, LLC, Washington, UT (US)

( * ) Notice: Subject to any disclaimer, the term of this patent is extended or adjusted under 35 U.S.C. 154(b) by 83 days.

(21) Appl. No.: 18/231,023

(22) Filed: Aug. 7, 2023

(65) Prior Publication Data

US 2024/0108046 A1 Apr. 4, 2024

Related U.S. Application Data

(62) Division of application No. 18/136,476, filed on Apr. 19, 2023.

(Continued)

(51) Int. Cl.

*A23L 29/00* (2016.01)

*A21D 2/16* (2006.01)

(Continued)

(52) U.S. Cl.

CPC .............. *A23L 29/04* (2016.08); *A21D 2/165* (2013.01); *A21D 2/183* (2013.01); *A21D 2/261* (2013.01);

(Continued)

(58) Field of Classification Search

CPC ....... A23L 29/10; A21D 13/045; A21D 13/44; A21D 13/80; A21D 13/043; A21D 13/047;

(Continued)

(56) References Cited

U.S. PATENT DOCUMENTS

2006/0029713 A1 2/2006 Eckert
2007/0148318 A1 6/2007 Rubio et al.

(Continued)

FOREIGN PATENT DOCUMENTS

CN 107712900 A 2/2018
CN 110839799 A 2/2020

(Continued)

OTHER PUBLICATIONS

"An Overview of MCT Oil and Medium-Chain Triglycerides". Available online at https://www.acme-hardesty.com on Nov. 16, 2018 (Year: 2018).*

(Continued)

*Primary Examiner* — Erik Kashnikow
*Assistant Examiner* — Assaf Zilbering
(74) *Attorney, Agent, or Firm* — Workman Nydegger

(57) ABSTRACT

Protein-complexed MCT oil includes MCT droplets or particles encapsulated by and/or complexed with protein-based wall material. Protein-complexed MCT oil can be used as an additive for food products. The wall material includes protein, e.g., pea protein, emulsifier(s), optional co-emulsifier(s), and optional polysaccharide(s). Protein-complexed MCT oil may optionally include supplemental oil(s), such as that contain one or more essential omega-3 fatty acids (ALA, EPA and DHA) and optionally one or more essential omega-6 fatty acids. The protein-complexed MCT oil may be consumed by users as desired, e.g., by adding the protein-complexed MCT oil to food or drink products, such as plant flour (e.g., to make blended plant-MCT flour), liquid coffee creamer, bubble tea, jelly, ice cream, yogurt, processed meats (e.g., lunch meat), pet foods, baked foods, vitamin supplements, energy bars, and drink mixes. The food and drink products have increased nutrition provided by the MCT oil and pea protein.

23 Claims, 3 Drawing Sheets

Related U.S. Application Data

(60) Provisional application No. 63/412,721, filed on Oct. 3, 2022.

(51) Int. Cl.

| | |
|---|---|
| ***A21D 2/18*** | (2006.01) |
| ***A21D 2/26*** | (2006.01) |
| ***A21D 6/00*** | (2025.01) |
| ***A21D 13/04*** | (2017.01) |
| ***A21D 13/043*** | (2017.01) |
| ***A21D 13/045*** | (2017.01) |
| ***A21D 13/047*** | (2017.01) |
| ***A21D 13/066*** | (2017.01) |
| ***A21D 13/44*** | (2017.01) |
| ***A21D 13/80*** | (2017.01) |
| ***A23L 7/10*** | (2016.01) |
| ***A23L 29/10*** | (2016.01) |
| ***A23L 33/115*** | (2016.01) |

(52) U.S. Cl.

CPC ............ *A21D 2/262* (2013.01); *A21D 2/263* (2013.01); *A21D 2/265* (2013.01); *A21D 2/266* (2013.01); *A21D 6/003* (2013.01); *A21D 13/04* (2013.01); *A21D 13/043* (2017.01); *A21D 13/045* (2017.01); *A21D 13/047* (2017.01); *A21D 13/066* (2013.01); *A21D 13/44* (2017.01); *A21D 13/80* (2017.01); *A23L 7/101* (2016.08); *A23L 7/115* (2016.08); *A23L 29/10* (2016.08); *A23L 33/115* (2016.08)

(58) Field of Classification Search

CPC ........ A21D 2/165; A21D 2/183; A21D 2/261; A21D 2/262; A21D 2/263; A21D 2/265; A21D 2/266; A21D 6/003; A21D 13/04; A21D 13/066

See application file for complete search history.

(56) References Cited

U.S. PATENT DOCUMENTS

| | | | | |
|---|---|---|---|---|
| 2009/0004333 | A1 | 1/2009 | Nakhasi et al. | |
| 2010/0119684 | A1 | 5/2010 | Santana et al. | |
| 2012/0053251 | A1* | 3/2012 | Ervin ..................... | A23D 7/013 426/573 |
| 2016/0058039 | A1 | 3/2016 | Sanguansri et al. | |
| 2016/0081927 | A1* | 3/2016 | Bromley ............ | A61K 31/4375 514/283 |
| 2020/0060310 | A1* | 2/2020 | Schmidt .................... | A23L 5/10 |
| 2020/0107564 | A1 | 4/2020 | Barbieri et al. | |
| 2021/0037866 | A1 | 2/2021 | Zhang | |
| 2021/0092987 | A1* | 4/2021 | Hanasaki ............... | A61K 8/645 |
| 2022/0192238 | A1* | 6/2022 | Smith ..................... | A23L 29/10 |
| 2023/0106086 | A1 | 4/2023 | Reddy | |
| 2023/0140841 | A9 | 5/2023 | Wagner Salvini | |

FOREIGN PATENT DOCUMENTS

| | | | | |
|---|---|---|---|---|
| CN | 107343657 B | * | 2/2021 | ............ A23L 33/115 |
| CN | 114766674 A | | 7/2022 | |

OTHER PUBLICATIONS

"The Milling Process Unveiled". Available online at https://fastercapital.com/keyword/milling-process.html. (Year: 2018).*

Non-Final Rejection Mailed on Aug. 30, 2023 for U.S. Appl. No. 18/136,476, 9 page(s).

Red Tractor Foods, Coconut & MCT Flour Blend, Jul. 2, 2021.

Red Tractor Foods, Healthy Baking Coconut & MCT Flour Blend, available online atleast as early as Sep. 2022.

San et al., "Effects of wall material on medium-chain triglyceride oil microcapsules prepared by spray drying," Pharmaceutics, (2022) pp. 1-10.

International Search Report and Written Opinion received for PCT Patent Application No. PCT/US2023/075719, mailed on Feb. 7, 2024, 13 pages.

International Search Report and Written Opinion received for PCT Patent Application No. PCT/US23/75711, mailed on Feb. 16, 2024, 13 pages.

* cited by examiner

PROTEIN-COMPLEXED MCT OIL, METHOD OF MANUFACTURE, AND FOOD PRODUCTS MADE THEREFROM

CROSS-REFERENCE TO RELATED APPLICATIONS

This application is a division of U.S. patent application Ser. No. 18/136,476, filed Apr. 19, 2023, which claims the benefit of U.S. Provisional Application No. 63/412,721, filed Oct. 3, 2022. The foregoing applications are incorporated by reference in their entirety.

BACKGROUND

Medium chain triglycerides (MCT) are a popular source of easily digested fats that can be immediately utilized as energy in place of carbohydrates. MCT is often used by people who wish to limit carbohydrates and/or who are on a ketogenic diet. MCT can provide a number of benefits, including reducing stored body fat, maintaining healthy weight, increasing energy, boosting brain function, banishing brain fog, improving digestion and nutrient absorption, and balancing specific hormones.

Medium chain triglycerides are commonly provided in liquid form (MCT oil) and can be used like other oils in cooking and as a food additive. In liquid form, MCT mostly comprises C8 and C10 triglycerides, with little or no C6 and C12 triglycerides. C6 triglycerides can have pour taste, and C12 triglycerides take longer C3) to digest and are not as easily utilized as a ready source of energy. Some find, however, that pure MCT oil can cause loose stools and other gastrointestinal tract (GI) issues.

MCT can also be provided in powder form, which is convenient for adding to other dry ingredients and as a convenient way to package and dispense MCT. In order to change liquid MCT oil into a solid powder form, manufacturers typically mix the oil with a carrier substance (usually an aqueous starch) and then spray-dry the mixture into a powder form. MCT powders typically contain 20-50% starch, meaning they are high in carbohydrates, plus other additives. Such high starch content can pose a problem for athletes, health enthusiasts, and people on a ketogenic diet who wish to limit their intake of carbohydrates and additives.

Carrier powders used in the spray drying process are most often low-quality starches that are cheap and easy to work with. The starch-to-MCT ratio can vary from product to product, but MCT powders will generally contain anywhere from 50-80% MCTs, and 20-50% starchy powder. This is not only a problem for people trying to avoid carbohydrates, but it can also be an issue for people with food sensitivities or those who want to maintain a whole foods diet.

Common additives for the spray-drying process include soluble corn fiber and other grain-based fillers, acacia fiber (derived from the sap of the acacia tree), maltodextrin (usually made from corn or wheat), soy lecithin (soy-derived), sodium caseinate (dairy-derived), glucose syrup solids (derived from corn, rice. wheat. or potato starch), and other additives that are not reported on the label.

Not all fillers are bad. Acacia fiber, for example, is high in soluble fiber and less likely than other fillers to cause digestive upset. Corn and grain-based fillers, on the other hand, can cause some side effects and contribute little to nothing in the way of nutrition. They can deleteriously alter blood sugar. Depending on the type of carrier and the starch-to-fat ratio, MCT powders can raise insulin levels and kick a person out of ketosis.

As mentioned above, MCT oil has a reputation for causing loose stools if one takes too much at once. This can be avoided by starting with small doses (1 tsp.) and working up to higher amounts over time. Some people report far less gastrointestinal distress (GI) with MCT powders, particular at higher doses, but that does not mean MCT powders are completely harmless relative to gut health. Most bulk MCT powders use carriers and other fillers, such as glucose syrup solids, corn byproducts, and maltodextrin, which may contain food allergens and are potential gut irritants. Corn, soy, wheat, and dairy-based fillers can be a problem for people with allergies or sensitivities to these ingredients and many are made from genetically modified grains. If a person suffers from food allergies, sensitivities, or wishes to maintain a special diet like paleo or AIP (autoimmune protocol), they need to avoid these fillers.

Apart from including high amounts of carbohydrates and additives, there are benefits to using MCT powder. Some people consider MCT powder to be a more versatile option than MCT oil, especially when adding MCT to a powdered supplement. For instance, if a manufacturer wants to add fat-burning MCT to whey or other protein mix, MCT powder facilitates this compared to oil. Powder has other benefits, such as:

easily add MCT to powders, other supplements. and baked goods;

add a rich texture to smoothies, coffee. and baked goods;

because the powder is cut with a starch, users are less likely to experience;

digestive distress, which is common with high doses of liquid MCT;

powders are easier to put into single-use packets and are generally easier to travel with.

Accordingly, there is a long-felt, but unsatisfied need to find ways to make healthier MCT powders that can be used as an alternative to liquid MCT. There is also a long-felt but unsatisfied need to find unique and beneficial ways to deliver effective doses of MCT to a subject without causing GI upset or distress.

SUMMARY

Disclosed herein is protein-complexed MCT oil, which comprises MCT droplets or particles encapsulated by and/or complexed with a protein-based wall structure comprised of protein, emulsifier, optional polysaccharide, and optional co-emulsifier. In some embodiments, MCT droplets or particles form MCT cores, and the protein-based wall structure forms protein-based shells that at least partially encapsulate the MCT cores. Also disclosed are methods for making and using protein-complexed MCT oil and products made therefrom.

Protein-complexed MCT oil may form a sub-component of plant-MCT flour or may be used as an alternative MCT source (e.g., in powder form) or component in other food products or as a stand-alone product that user can add to food products and/or consumed as desired. For example, protein-complexed MCT oil can be used to make and/or comprise an additive to food products, such as plant flour (e.g., to make blended flour), liquid coffee creamer, bubble tea, jelly, ice cream, yogurt, processed meats (e.g., lunch meat), pet foods, baked foods, vitamin supplements, energy bars, and drink mix.

Because MCT is an oil and typically a liquid at room temperature, protein-complexed MCT oil comprises micro- and/or nano-sized MCT droplets or particles encapsulated by and/or complexed with a protein-based wall structure to form complexed MCT particles. In preferred embodiments, MCT used to make protein-complexed MCT oil comprises one or more of C8 (caprylic acid) triglyceride, C10 (capric acid) triglyceride, mixture of C8 and C10 triglycerides, or C8 and C10 mixed triglycerides. In preferred embodiments, the wall structure of complexed MCT particles comprises protein (e.g., pea protein), optionally polysaccharide (e.g., starch), emulsifier (e.g., gum Arabic). and optional co-emulsifier (e.g., calcium and/or sodium stearoyl lactylate). In other embodiments, polysaccharide fiber (e.g., acacia fiber) can be used in addition to the protein to form the wall structure of protein-complexed MCT oil. Protein-complexed MCT oil may optionally contain one or more supplemental oils (e.g., that contain unsaturated fat), which supplement and/or replace a portion of the MCT oil.

Forming protein-complexed MCT particles creates the powdered nature of MCT and maintains the stability and freshness of protein-complexed MCT particles and products made therefrom. Depending on the ratio of wall material to MCT, there may be an excess of wall material such that a portion of the wall material may form empty micelles, vesicles, or assembled complexes that do not contain and/or are not complexed with MCT. In some cases, an “empty” micelle may include a water droplet instead of MCT. In other cases, assembled complexes may include only wall material. Including an excess of wall material ensures that all or substantially all of the MCT is encapsulated by and/or complexed with wall material.

Protein-complexed MCT oil may comprise clusters of micro- and/or nanosized complexed MCT particles and excess wall material, such as nanomicelles, nanovesicles, uncombined protein, and/or uncombined emulsifier, which may form clusters with themselves or complexed MCT droplets or particles. In some embodiments, the MCT droplets or particles form MCT cores, and the wall structure forms shells that at least partially encapsulate the MCT cores.

Protein-complexed MCT oils disclosed herein are markedly different and perform substantially better than traditional MCT powders (i.e., MCT oil spray-dried with polysaccharide). Conventional MCT powders typically contain up to 50% polysaccharide. Thus, such MCT powders significantly increase the polysaccharide content of food products made therewith.

Consuming MCT oil in liquid or powder form commonly causes GI problems, such as stomach upset and/or diarrhea. In contrast, protein-complexed MCT oil disclosed herein alter the way the body absorbs MCT and reduces or eliminates GI problems commonly associated with consuming an effective amount of MCT oil.

An example method of manufacturing protein-complexed MCT oil comprises: (1) forming a protein-based wall material slurry comprised of water, protein, emulsifier(s), and optional polysaccharide; (2) combining MCT oil and optionally a supplemental oil (such as unsaturated fat) with the wall material slurry to form a heterogeneous mixture; (3) subjecting the heterogeneous mixture to high speed shearing to form an emulsion; (4) subjecting the emulsion to high pressure nanolization to form micro- and/or nano-sized composite droplets; and (5) spray-drying the nanolized composite droplets or particles with heated air to remove water by evaporation and form dried protein-complexed MCT oil particles.

The use of high-speed shearing to form the emulsion can result in a physical and/or chemical transformation of the components. Optional polysaccharides can combine with the protein and emulsifier, which can be a polysaccharide, to form a new type of composite wall material. This composite wall material can be used to encapsulate and/or form a complex with MCT oil (and optional supplemental oil) to form a new type of protein-complexed MCT oil with advantageous properties not found in existing MCT powders.

Protein-complexed MCT oil can be used in place of MCT oil and conventional MCT powder in a variety of food or drink applications. For example, the protein-complexed MCT oil can form part of and/or be added to food products such as plant flours (e.g., to make blended flours), liquid coffee creamer, bubble tea, jelly, ice cream, yogurt, processed meats (e.g., lunch meat), pet foods, baked foods, vitamin supplements, energy bars. and drink mixes. The MCT oil provides a ready source of caloric energy that can be readily converted into ketone bodies that the body can convert to ATP.

The one or more optional supplemental oils (e.g., that contain unsaturated fats), when included, can be selected to provide a source of essential omega-3 and omega-6 polyunsaturated fatty acids, which are fatty acids that provide health benefits when not consumed in excess and provided in correct ratios. Essential omega-3 polyunsaturated fatty acids include alpha-linolenic acid (ALA), eicosapentaenoic acid (EPA), and docosahexaenoic acid (DHA). Essential omega-6 polyunsaturated fatty acids include linoleic acid and gamma-linolenic acid (GLA). Oleic acid is an example of a non-essential omega-9 fatty acid. Examples of non-essential omega-7 fatty acids include palmitoleic acid and vaccenic acid.

In some embodiments, dried protein-complexed MCT oil made by the preceding process can be the final MCT product. In other embodiments, dried protein-complexed MCT oil particles can be mixed and sieved to produce a refined MCT powder with more uniform particle size. The larger particles removed by sieving can be reground and added back to the refined protein-complexed MCT oil powder, used as a coarser protein-complexed MCT oil powder for making food products, and/or recycled back to the wall material slurry and/or heterogeneous mixture used to form the nano emulsion in the process described above.

In some embodiments, protein-complexed MCT oil can be blended with one or more other materials to form a blended product. For example, a first protein-complexed MCT oil made using one type of protein and optional polysaccharide as wall material can be blended with a second protein-complexed MCT oil made using a different wall material. Alternatively, protein-complexed MCT oil can be blended with one or more native flours to form blended MCT flour products having desired nutrition and/or performance properties, such as increased protein and/or healthy fat profile. Blended MCT flour can include gluten flour, gluten-free flour, and/or law carbohydrate flour.

Blended MCT flour products made using the protein-complexed MCT oil disclosed herein can replace and/or supplement traditional flours to make food products, such as baked goods, fried goods, and boiled goods, including but not limited to, breads, biscuits, rolls, buns, cakes, cupcakes, pies, bagels, muffins, flatbread, cakes, brownies, pastries, cookies, crackers, tarts, puff pastries, donuts, tarts, turnovers, crepes, pancakes, waffles, crumpets, cornbread, muffuletta, breaded meats, dumplings, pasta, noodles, tortellini, ravioli, ice cream, yogurt, and the like.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein or as claimed.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION

Introduction

Figure 1:
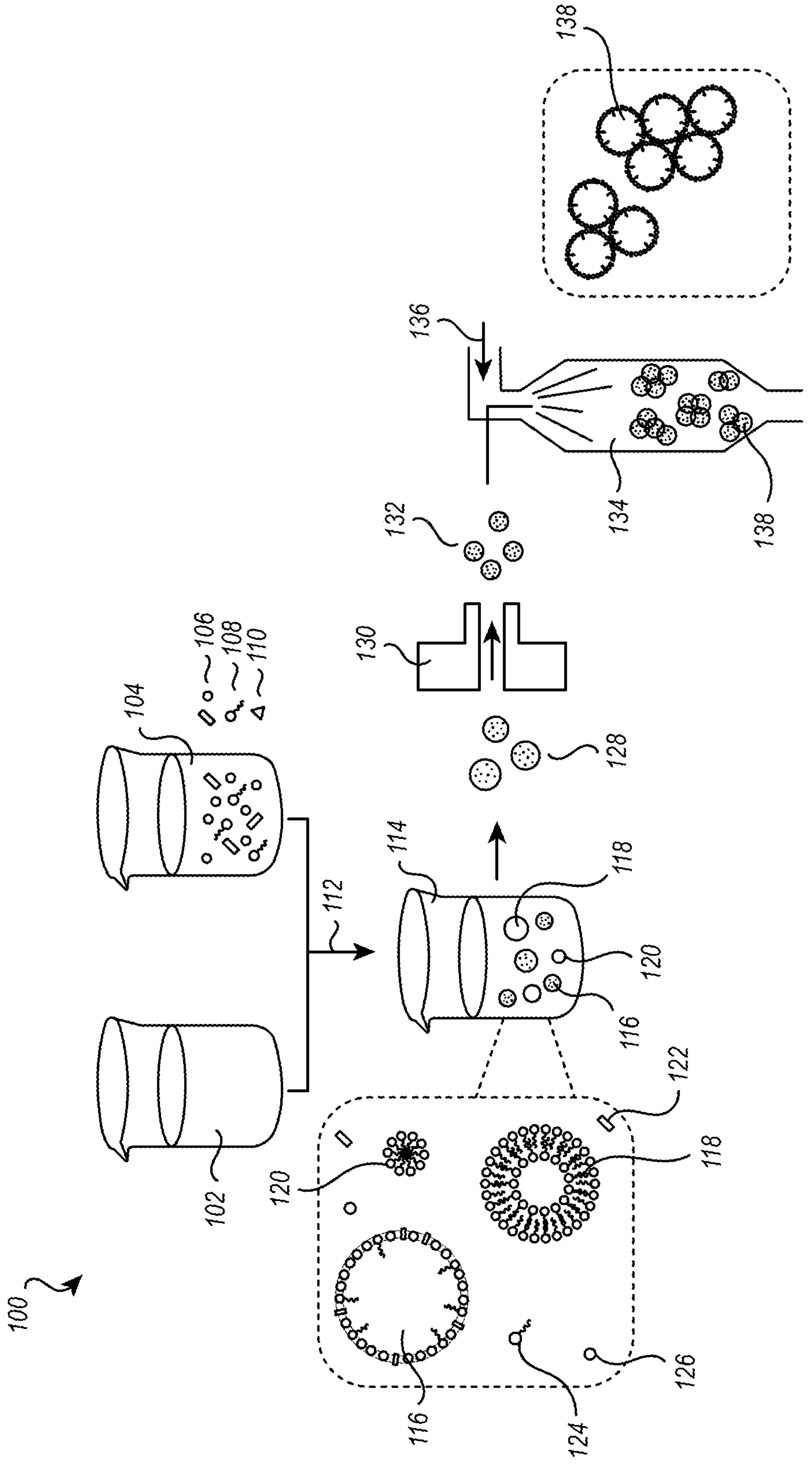
FIG. 1 schematically depicts steps that can be used in the formation of protein-complexed MCT oils.

Protein-complexed MCT oils disclosed herein have improved nutritional and performance profiles compared to traditional MCT powders. The protein-complexed MCT oil disclosed herein comprises protein-complexed MCT droplets or particles. which comprise MCT droplets or particles encapsulated by and/or complexed with a protein-based wall structure comprised of protein, emulsifier, optional polysaccharide, and optional co-emulsifier.

Protein-complexed MCT oil may form a sub-component of plant-MCT flour or may be used as an alternative MCT source (e.g., in powder form) or component in other food products or as a stand-alone product that user can add to food products and/or consumed as desired. For example, protein-complexed MCT oil can be used to make and/or comprise an additive to food products, such as plant flour (e.g., to make blended flour), liquid coffee creamer, bubble tea, jelly, ice cream, yogurt, processed meats (e.g., lunch meat), pet foods, baked foods, vitamin supplements, energy bars, and drink mixes.

Consuming MCT oil in either oil form or powder form commonly causes GI upset and/or diarrhea. In contrast, the disclosed protein-complexed MCT oil alters the way the body absorbs MCT and reduces or eliminates GI problems commonly associated with MCT consumption. Encapsulating and/or complexing MCT droplets or particles with protein-based wall material comprising protein and carbohydrate beneficially balances fat, protein and carbohydrate, aiding in better digestibility.

Protein-Complexed MCT Oil

Protein-complexed MCT oil comprises MCT droplets or particles encapsulated by and/or complexed with a protein-based wall structure comprised of protein, emulsifier, optional polysaccharide, and optional co-emulsifier. Because MCT is an oil and typically a liquid at room temperature, protein-complexed MCT oil comprises micro- and/or nano-sized MCT droplets or particles encapsulated by and/or complexed with a protein-based wall structure to form protein-complexed MCT particles. In some embodiments, MCT droplets or particles form MCT cores and the protein-based wall structure forms protein-based shells that at least partially encapsulate the MCT cores.

MCT Oils

The MCT droplets or particles contained within protein-complexed MCT oil comprise one or more of C6 triglyceride, C8 triglyceride, C10 triglyceride, C12 triglyceride, or mixed triglyceride thereof. In preferred embodiments, MCT droplets or particles comprise one or more of C8 triglyceride, C10 triglyceride, or C8/C10 mixed triglyceride.

Proteins

The protein used to make the wall structure in protein-complexed MCT oil can be at least one of plant protein or animal protein. Example plant proteins include, but are not limited to, pea protein, hemp protein, pumpkin seed protein, rice protein, soy protein, sunflower seed protein, sacha inchi (*Plukenetia volubilis*) protein, chia protein, *quinoa* protein, and combinations thereof. Example animal proteins include, but are not limited to, whey protein, casein, egg protein, beef protein, chicken protein, fish protein, collagen, and combinations thereof. In currently preferred embodiments, % CY) the protein comprises one or more plant proteins, more preferably pea protein.

Pea protein is a common source of plant food protein and can be derived and extracted from yellow and green split peas, *Pisum sativum*. It can be used as a dietary supplement to increase an individual's protein or other nutrient intake, or as a substitute for other food products. As a powder, it can be used as an ingredient in food manufacturing, such as a thickener, foaming agent, or an emulsifier.

It can be extracted in powder form and can be processed and produced in different ways. It can be made as an isolate through wet fractionation, which produces a high protein concentration. It can be made as a concentrate through the process of dry fractionation, which produces a low protein concentration. It can be in textured form, which is when it is used in food products as a substitute for other products, such as meat alternatives Pea protein is a food source due to its availability, low allergenicity, and high nutritional value.

Pea protein is rich in nutrients such as protein and carbohydrates, also contains vitamins and minerals, and is low in fat. Peas typically contain 23.1-30.9% protein, 1.5-2.0% fat, and minor constituents, such as vitamins, phytic acid, saponins, polyphenols, minerals, and oxalates. They also contain several classes of protein: globulin, albumin, prolamin, and glutelin. The proteins are mainly albumins and globulins, which account for 10-20% and 70-80% of the protein in the pea seed, respectively. The albumins are water soluble and considered to be metabolic and enzymatic proteins, while the globulins are salt soluble and act as the storage proteins for the seed. Globulins can be further classified into legumin and vicilin. Legumin (a family of globular proteins) is a hexameric protein; vicilin proteins are trimers.

Pea seeds contain 60-65% carbohydrates, mainly composed of oligosaccharides, monosaccharides, polysaccharides, and disaccharides. The major carbohydrate fraction in peas is starch, which is the major storage carbohydrate in the cotyledons. Peas also contain high levels of dietary fiber, which consists of cellulose, gums, hemicellulose, pectin, mucilage, lignin, and resistant starches. Dry peas have 17-27% dietary fiber depending on cultivar, environment, and global growing region. Pea seeds also contain 5-6% sucrose and other saccharides. Sucrose ranges from 2.2% to 2.6%, stachyose ranges from 1.3-3.2%, verbascose ranges from 1.2-4.0%, and raffinose ranges from 0.2-1.0% depending on cultivar and environment.

The fat content of pea seeds ranges from 1.2% to 1.8% depending on cultivar. About 25% of fatty acids are composed of oleic acid and 50% of linoleic acid. Pea seeds are also a rich source of minerals and vitamins, such as folic acid, riboflavin, pyridoxine, and niacin.

Emulsifiers

The emulsifier(s) used to make the wall material for forming the wall structure used to make protein-complexed MCT oil can be gum Arabic, acacia fiber, xanthan gum, guar gum, gellan gum, carrageenan, locust bean gum, pectin, starch, soy lecithin, egg lecithin, agar-agar, dextrin, monoglycerides, diglycerides, and combinations thereof. In currently preferred embodiments, the emulsifier comprises gum Arabic.

Co-Emulsifiers

Optional co-emulsifiers used to make wall material for forming the wall structure used to make protein-complexed MCT oil can be calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, sucrose fatty acid ester, and combinations thereof. In currently preferred embodiments, the co-emulsifier comprises calcium stearoyl lactylate and/or sodium stearoyl lactylate.

Polysaccharides

Optional polysaccharides may comprise starch or other polysaccharide, such as pectin. cellulose derivatives. inulin, xylan, arabinoxylan, and chitin. Example starches include, but are not limited to, corn starch, potato starch, wheat starch, rice starch, cassava starch, and combinations thereof.

Supplemental Oils

The protein-complexed MCT oil may optionally contain one or more supplemental oils (e.g., that contain one or more unsaturated fats), which supplement and/or replace a portion of the MCT oil and can provide a source of essential omega-3 and omega-6 polyunsaturated fatty acids, which are fatty acids that provide health benefits when not consumed in excess and provided in correct ratios. Essential omega-3 polyunsaturated fatty acids include alpha-linolenic acid (ALA), eicosapentaenoic acid (EPA), and docosahexaenoic acid (DHA). Essential omega-6 polyunsaturated fatty acids include linoleic acid and gamma-linolenic acid (GLA). An example non-essential omega-9 fatty acid is oleic acid. Examples of non-essential omega-7 fatty acids include palmitoleic acid and vaccenic acid.

Example plant-based supplemental oils that can be included in addition to and/or that replace a portion of the MCT oil include but are not limited to avocado oil, Brazil nut oil, canola oil, corn oil, cottonseed oil, flaxseed oil, grape see oil, hemp seed oil, olive oil, palm oil, peanut oil, rice bran oil, safflower oil (e.g., high oleic), sesame oil, soybean oil, walnut oil, hazelnut oil, and sunflower oil. Examples of animal-based supplemental oils that can be included in addition to and/or that replace a portion of the MCT oil, include but are not limited to mackerel oil, salmon oil, seabass oil, oyster oil, sardine oil, shrimp oil, krill oil, herring oil, whale oil, halibut M) oil, rainbow trout oil, tuna oil, cod liver oil, other fish oils, and butterfat.

Some oils are considered to be more nutritious than others, and more nutritionally sound oils are preferred. Nevertheless, when used in relatively small amounts, even oils considered to be less nutritional can provide a source of essential omega-3 and omega-6 polyunsaturated fatty acids when consumed in minor quantities and that provide a healthy ratio of polyunsaturated fats. Plant oils contain the essential omega-3 fatty acid alpha-linolenic acid (ALA) and essential omega-6 fatty acids. Fish oils contain the essential omega-3 fatty acids eicosapentaenoic acid (EPA) and docosahexaenoic acid (DHA). Butterfat can provide a source of healthy butyric acid and glycerides thereof, such as tributyrin.

Systems and Methods for Manufacturing Protein-Complexed MCT Oil

An example method of manufacturing protein-complexed MCT oil comprises:

- forming protein-based wall material slurry comprised of water, protein, emulsifier, optional polysaccharide, and optional co-emulsifier;
- combining MCT oil, and optionally a supplemental oil, with the protein-based wall material slurry to form a heterogeneous mixture;
- subjecting the heterogeneous mixture to high-speed shearing to form an emulsion comprised of MCT droplets or particles at least partially encapsulated by and/or complexed with protein-based wall material;
- subjecting the emulsion to high pressure nanolization to form micro- and/or nano-sized composite droplets; and
- spray-drying the nanolized composite droplets with heated air to remove water by evaporation and form dried protein-complexed MCT droplets or particles encapsulated by and/or complexed with a protein-based wall structure comprised of the protein, emulsifier, optional polysaccharide, and optional co-emulsifier.

In some embodiments, dried protein-complexed MCT oil made by processes disclosed herein, but before sieving, can be a final protein-complexed MCT oil product. In other embodiments, the dried protein-complexed MCT oil can be mixed and sieved to produce a refined protein-complexed MCT oil product with more uniform particle size. Larger particles removed by sieving can be reground and added back to the refined protein-complexed MCT oil product, used as a coarser protein-complexed MCT oil product, and/or recycled back to the wall material slurry and/or heterogeneous mixture used to form the initial emulsion in the process above.

FIG. 1 illustrates an example system 100 for manufacturing protein-complexed MCT oils within the scope of the disclosure. System 100 includes a container or hopper 102 with MCT oil and a container, hopper, or mixer 104 with water, protein particles 106, emulsifier (and optional co-emulsifier) 108, and optional polysaccharide 110. The optional polysaccharide 110 may be provided by adding a relatively small amount of plant flour as a contributing source of wall material.

A high-speed shearing mixer 112 is used to form an emulsion 114. The emulsion 114, preferably a nano-emulsion, comprises various components, including encapsulated MCT oil or particles 116, nanovesicles 118 having a double layer structure with a hydrophilic shell surface and aqueous phase inside containing water, nanomicelles 120 having a hydrophilic outer surface and hydrophobic core, excess protein particles 122, excess emulsifier (and optional co-emulsifier) particles 124, and optional polysaccharide fragments 126. The optional polysaccharide fragments 126 may comprise plant flour fragments as a source of polysaccharide and protein.

A high pressure nanolizer device or system 130 processes emulsion droplets 128 to form micro-sized and/or nano-sized composite droplets (e.g., protein-complexed MCT oil nanocapsules 132), which are sent to a spray-drying apparatus or system 134. Heated air 136 dries the nanocapsules 132 and forms dried clusters 138 that make up the protein-complexed MCT oil.

Figure 2:
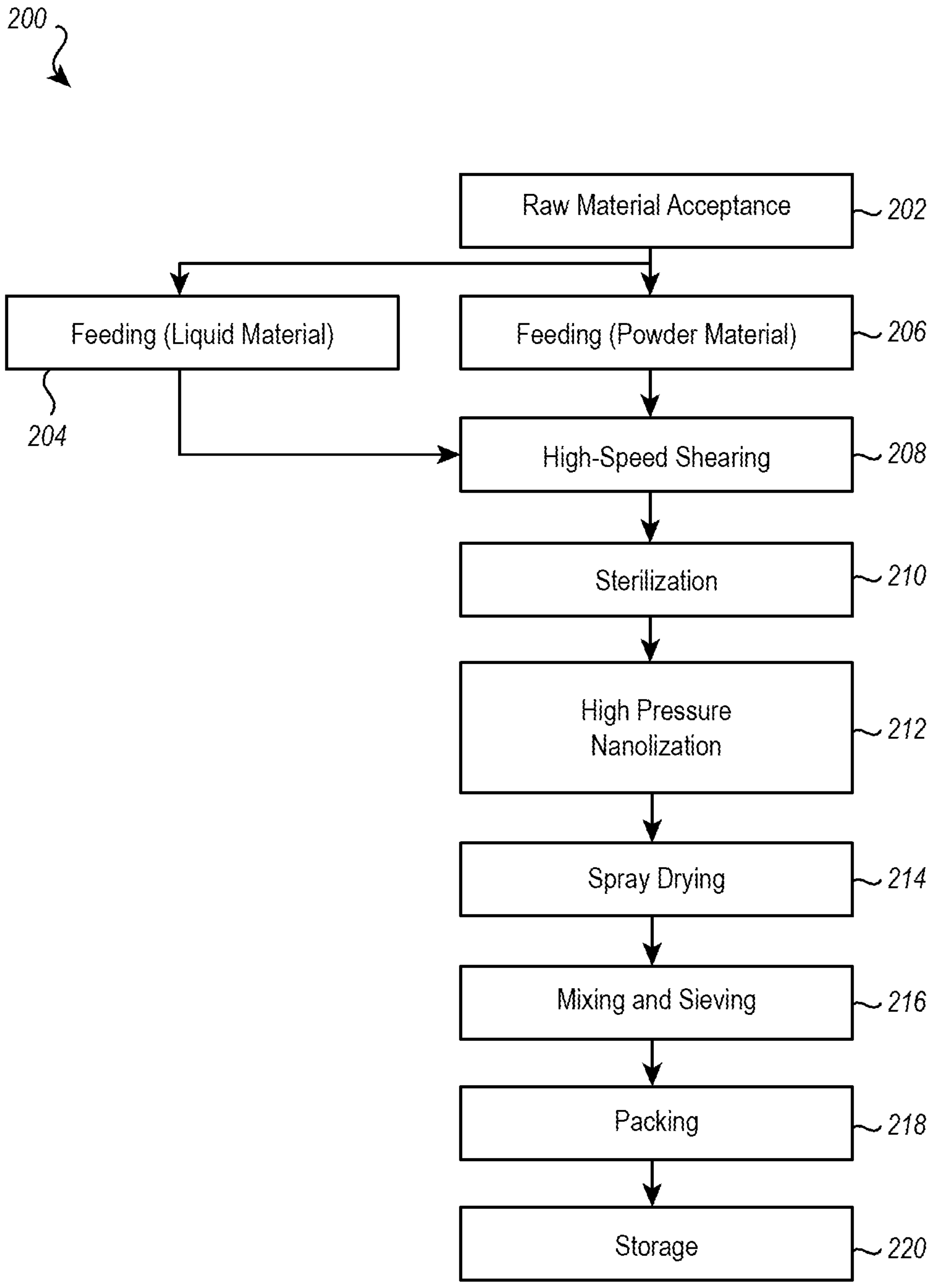
FIG. 2 is a flow chart that illustrates an example method of manufacturing protein-complexed MCT oils.

FIG. 2 is a flow chart that illustrates an example method 200 of manufacturing protein-complexed MCT oil. In raw material acceptance step 202, the ingredients are weighed according to an established or desired formula. In first feeding step 206. plant protein nanoparticles, emulsifiers. optional co-emulsifiers, and optional polysaccharide are dispersed into water to form a wall material aqueous slurry. In a second feeding step 204, MCT oil, and optionally supplemental oil, is/are added to the wall material aqueous solution to form a heterogeneous mixture.

In high-speed shearing step 208, the heterogeneous mixture is mixed evenly by high-speed shearing to form an initial nano-emulsion, which is mainly comprised of protein-complexed MCT oil microcapsules, nano-micelles, and nanovesicles formed by emulsifiers and co-emulsifiers, free plant protein and emulsifier nanoparticles, and optionally polysaccharide particles. The protein-complexed MCT oil microcapsules comprise MCT droplets or particles at least partially encapsulated by and/or complexed with wall material.

In some embodiments, protein nanoparticles, emulsifier (s), optional co-emulsifier(s), and optional polysaccharide(s) are assembled at the oil/water interface, with the optional polysaccharide acting as a polymer to fill crevices in the wall material or structure, thus forming complete outer shells to embed MCT oil droplets and particles, thereby forming protein-complexed MCT oil microcapsules.

In sterilization step 210, the initial nano-emulsion is sterilized, such as at a temperature of about 90° C. to about 100° C., such as for about 25 to about 35 seconds, to remove or kill essentially all microorganisms.

In high pressure nanolization step 212, the initial nano-emulsion is homogenized under a pressure of about 40 MPa to about 100 MPa. The high mechanical pressure generated by high pressure disperses the mixture of protein-complexed MCT oil microcapsules, nanomicelles, and nanovesicles into homogeneous protein-complexed MCT oil nanocapsules.

In a spray-drying step 214, the nanoemulsion of protein-complexed MCT oil nanocapsules is converted into protein-complexed MCT oil nanocapsule clusters. The inlet air temperature is maintained at about 160° C. to about 220° C., and the outlet air temperature is maintained at about 75° C. to about 100° C.

In mixing-sieving step 216, the intermediate product is mixed in a blender and then sieved to obtain protein-complexed MCT oil with relatively uniform particle size.

In packing step 218, the protein-complexed MCT oil is packed into aluminum foil bags using a packaging machine known to those skilled in the art.

In storage step 220, protein-complexed MCT oil is stored in a cool, ventilated, and dry environment. To maintain cleanliness, the storage warehouse should be equipped with an electronic rodent proof device, fly extinguisher, and other pest control facilities.

Properties and Uses of Protein-Complexed MCT Oil

Forming dried protein-complexed MCT oil creates the powdered nature of MCT and maintains the stability and freshness of the protein-complexed MCT oil and products made therewith. Depending on the ratio of wall material to MCT, there may be an excess of wall material such that a portion of the wall material may form empty micelles, vesicles, or assembled complexes that do not contain and/or are not C) complexed with MCT. In some cases, “empty” micelles may include water droplets instead of MCT droplets or particles. In other cases, assembled complexes may include only wall material. Including an excess of wall material ensures that all or substantially all of the MCT is encapsulated by and/or complexed with wall material.

Protein-complexed MCT oils, when in powder form, can have a particle size less than about 100 μm, or less than about 50 μm, or less than about 10 μm, or less than about 5 μm, or less than about 1 μm, or less than about 500 nm, or less than about 250 nm, or less than about 100 nm.

Protein-complexed MCT oils disclosed herein are markedly different and perform substantially better than traditional MCT powders (i.e., MCT oil spray-dried with polysaccharide). Conventional MCT powders typically contain up to 50% polysaccharide. Thus, such MCT powders can significantly increase polysaccharide content of food products made therewith.

Consuming MCT oil in oil form or powder form commonly causes GI problems, such as stomach upset and/or diarrhea. In contrast, the protein-complexed MCT oils disclosed herein alter the way the body absorbs MCT and reduces or eliminates GI problems commonly associated with consuming an effective amount of MCT.

Protein-complexed MCT oil may be used as an alternative MCT source (e.g., in powder form) in food or drink products or as a stand-alone product that can be added to food or drink products and/or consumed by users as desired. For example, protein-complexed MCT oil can be used to make and/or comprise an additive to food or drink products, such as plant flour (e.g., to make blended flour), liquid coffee creamer, bubble tea, jelly, ice cream, yogurt, processed meats (e.g., lunch meat), pet foods, baked foods, vitamin supplements, energy bars, and drink mixes.

In some embodiments, protein-complexed MCT oil can be blended with one or more other materials to form a blended product. For example, a first protein-complexed MCT oil made using one type of protein and optional polysaccharide as wall material can be blended with a second protein-complexed MCT oil made using a different wall material. Alternatively, protein-complexed MCT oil can be blended with one or more native flours to form blended MCT flour products having desired nutrition and/or performance properties.

Blended Flours

In some embodiments, protein-complexed MCT oil can be blended with one or more plant flours to make a variety of blended flours. Examples of suitable plant flours that can be blended with protein-complexed MCT oil to make blended flour include gluten flours, gluten-free flours, and low carbohydrate flours. Example gluten flours include, but are not limited to wheat flour, barley flour, rye flour, spelt flour, and triticale flour. Example gluten-free flours include, but are not limited to oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, and *quinoa* flour. Example low carbohydrate flours include, but are not limited to seed, nut, or vegetable flours, such as coconut flour, almond flour, peanut flour, sesame flour, sunflower seed flower, hazelnut flour, walnut flour, soy flour, chickpea flour, flaxseed flour, and fava bean flour.

Blended MCT flour products made using the protein-complexed MCT oil disclosed herein can replace and/or supplement traditional flours to make food products, such as baked goods, fried goods, and boiled goods, including but not limited to, breads, biscuits, rolls, buns, cakes, cupcakes, pies, bagels, muffins, C flatbread, cakes, brownies, pastries, cookies, crackers, tarts, puff pastries, donuts, tarts, turnovers, crepes, pancakes, waffles, crumpets, cornbread, muffuletta, breaded meats, dumplings, pasta, noodles, tortellini, ravioli, ice cream, yogurt, and the like.

EXAMPLES

The examples describe exemplary protein-complexed MCT oils that can be used in place of traditional MCT oil and MCT powder when making food products.

Example 1

Protein-complexed MCT oil includes MCT droplets or particles encapsulated by and/or complexed with a wall structure. The wall structure comprises wall material formed from pea protein (protein source and emulsifier), calcium stearoyl lactylate (co-emulsifier), and sodium stearoyl lactylate (co-emulsifier). The MCT oil and wall materials are present in the following amounts (excluding water):

| | |
|---|---|
| MCT Oil (C8 and/or C10 triglycerides) | 50-70 wt % |
| Pea Protein | 30-50 wt % |
| Calcium Stearoyl Lactylate | 0.1-1.5 wt % |
| Sodium Stearoyl Lactylate | 0.1-1.5 wt % |

The protein-complexed MCT oil is made by (i) initially forming a wall material slurry comprising 50 wt % water and 50 wt % wall material composed of the pea protein, calcium stearoyl lactylate, and sodium stearoyl lactylate, (ii) high shear mixing of the MCT oil with the wall material slurry to form an emulsion comprise microencapsulated MCT oil droplets surrounded by wall material micelles, (iii) and nanolizing and spray drying to form dried protein-complexed MCT oil particles, which can form complexes. The protein-complexed MCT oil particles can be sieved to remove larger particles, which can be recycled back to the wall material slurry and/or material used to form the emulsion.

The protein-complexed MCT oil can be used as a substitute for MCT powder but with a better nutritional profile (e.g., by including protein) and reduced or no GI tract problems compared to MCT powder.

Example 2

Protein-complexed MCT oil includes MCT droplets or particles encapsulated by and/or complexed with a wall structure. The wall structure comprises wall material formed from pea protein, gum Arabic (emulsifier), and calcium stearoyl lactylate and/or sodium stearoyl lactylate (co-emulsifier). The MCT oil and wall materials are present in the following amounts (excluding water):

| | |
|---|---|
| MCT Oil (C8 and/or C10 triglycerides) | 40-60 wt % |
| Pea Protein | 25-50 wt % |
| Gum Arabic | 5-15 wt % |
| Calcium Stearoyl Lactylate | 0-1.5 wt % |
| Sodium Stearoyl Lactylate | 0-1.5 wt % |

The protein-complexed MCT oil is made by (i) initially forming a wall material slurry comprising 50 wt % water and 50 wt % wall material composed of the pea protein, gum Arabic, and calcium stearoyl lactylate and/or sodium stearoyl lactylate, (ii) high shear mixing of the MCT oil with the wall material slurry to form an emulsion comprise microencapsulated MCT oil droplets surrounded by wall material micelles, (iii) and nanolizing and spray drying to form dried protein-complexed MCT oil particles, which can form complexes. The protein-complexed MCT oil particles can be sieved to remove larger particles, which can be recycled back to the wall material slurry and/or material used to form the emulsion.

The protein-complexed MCT oil can be used as a substitute for MCT powder but with a better nutritional profile (e.g., by including protein) and reduced or no GI tract problems compared to MCT powder.

Example 3

Examples 1 and 2 are modified by including one or more plant-based supplemental oils in addition to and/or that replace a portion of the MCT oil, including one or more of avocado oil, Brazil nut oil, canola oil, corn oil, cottonseed oil, flaxseed oil, grape see oil, hemp seed oil, olive oil, palm oil, peanut oil, rice bran oil, safflower oil (e.g., high oleic), sesame oil. soybean oil, walnut oil, hazelnut oil, or sunflower oil. Plant-based oils can provide a source of essential omega-3 and omega-6 fatty acids and/or non-essential omega-7 and/or omega-9 fatty acids.

Example 4

Examples 1-3 are modified by including one or more animal-based supplemental oils in addition to and/or that replace a portion of the MCT oil and/or optional plant-based oil, including one or more of mackerel oil, salmon oil, seabass oil, oyster oil, sardine oil, shrimp oil, krill oil, herring oil, whale oil, halibut oil, rainbow trout oil, tuna oil, cod liver oil, other fish oils, or butterfat. Fish-based oils can provide a source of the essential omega-3 fatty acids EPA and DHA. Butterfat is a source of butyric acid in the form of tributyrin.

Example 5

Examples 1-4 are modified by replacing at least a portion of the pea protein with at least one plant protein selected from hemp protein, pumpkin seed protein, rice protein, soy protein, sunflower seed protein, sacha inchi (*Plukenetia volubilis*) protein, chia protein, or *quinoa* protein.

Example 6

Examples 1-5 are modified by replacing at least a portion of the plant protein with at least one animal protein selected from whey protein, casein. egg protein, beef protein, chicken protein, fish protein, or collagen.

Example 7

A mixed protein-complexed MCT oil is made by blending the protein-complexed MCT oil(s) of any of Examples 1-6 with any other protein-complexed MCT oil(s) of Examples 1-6.

Example 8

Food and drink products are made by adding the protein-complexed MCT oil(s) of any of Examples 1-7 to one of the following foods and drinks in amounts ranging from 1-20 wt. %: plant flour (e.g., to make blended plant-MCT flour), liquid coffee creamer, bubble tea, jelly, ice cream, yogurt, processed meat (e.g., lunch meat), pet food, baked food, vitamin supplement, energy bar, and drink mix. The food and drink products have increased nutrition provided by the MCT oil and pea protein.

Example 9

Blended plant-MCT flour is made by blending the protein-complexed MCT oil(s) of any of Examples 1-7 with one of more gluten flours, such as wheat flour, barley flour, rye flour, spelt flour, graham flour, or triticale flour.

Example 10

Reduced gluten blended plant-MCT flour is made by replacing 5-50% of the gluten flour in Example 9 with one or more gluten-free flours selected from oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, or *quinoa* flour.

Example 11

Gluten-free blended plant-MCT flour is made by replacing all of the gluten flour in Examples 9 and 10 with one or more gluten-free flours selected from oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, or *quinoa* flour.

Example 12

Reduced gluten and reduced carbohydrate blended plant-MCT flour is made by replacing 5-50% of the gluten flour in Example 9 with one or more gluten-free and low carbohydrate flours selected from coconut flour, almond flour, peanut flour, sesame flour, sunflower seed flower, hazelnut flour, walnut flour, soy flour, chickpea flour, flaxseed (linseed) flour, fava bean flour, pumpkin seed flour, lupine flour, red lentil flour, or white bran flour.

Example 13

Gluten-free and low carbohydrate blended plant-MCT flour is made by replacing the flour in any of Examples 9-12 with one or more gluten-free and low carbohydrate flours selected from coconut flour, almond flour, peanut flour, sesame flour, sunflower seed flower, hazelnut flour, walnut flour, soy flour, chickpea flour, flaxseed (linseed) flour, fava bean flour, pumpkin seed flour, lupine flour, red lentil flour, or white bran flour.

Comparative Example A

Conventional MCT powder is used instead of the protein-complexed MCT oils made or used in Examples 1-12. The MCT powder is made by spray-drying MCT oil with 30-50 wt % polysaccharide. The food, drink products, and blended plant-MCT flour have increased fat and carbohydrates but cause GI tract issues, particularly with C increased amounts of MCT powder.

Comparative Examples B

Conventional blended MCT flour is used instead of the blended plant-MCT flours in Examples 9-12. The food products have inferior quality and nutrition profile, with higher carbohydrates and less protein, and they cause GI tract issues, particularly with increasing amounts of MCT powder.

Gastrointestinal Tolerance Study

A gastrointestinal tolerance study was conducted by having test subjects eat cakes made from four different flours and then comparing the outcomes. Consumption of MCT oil can cause gastrointestinal (GI) distress. Acceptable intakes of MCT need to be determined. The purpose of this study was to determine the GI tolerance of baked products made using composite wheat-MCT flours with different MCT contents, as disclosed in U.S. Provisional Application No. 63/412,721, U.S. application Ser. No. 17/972,037, and U.S. application Ser. No. 18/096,784, which are incorporated by reference, compared to all-purpose wheat flour or blended wheat-MCT flour. It was a randomized, double-blind, placebo-controlled design with parallel groups. Although the study did not utilize blended plant-MCT flours, such as in Examples 9-12, the study is nonetheless useful and predictive of results that would be expected if the blended plant-MCT flours made according to Examples 9-12 had been used instead.

Small soy-based cakes of four different varieties were made using equivalent amounts of the following four flours mixed with soy milk and baked using conventional means:

| Fluor Type | MCT Content Per Cake |
| --- | --- |
| All-Purpose Cake (APC) Flour | 0 g |
| Blended APC Flour and MCT Powder | 10 g |
| Composite APC-MCT (7%) Flour | 7 g |
| Composite APC-MCT (10%) Flour | 10 g |

The subjects were divided into four groups in a random order and changed their diets every two days. The total study period was six days. The subjects consumed the test diet and completed a GI tolerance questionnaire. At day 7, the subjects were required to record their satisfaction with GI comfort over the past one week.

A GI tolerance questionnaire was used to record the occurrence and severity of eight GI domains including bloating, nausea, flatulence, GI cramping, diarrhea, constipation, abdominal pain, and GI rumbling. GI domains were scored with a 4-point scale (0=none, 1=mild, 2=moderate, 3=severe). These domains were chosen based on published articles of GI tolerance. For simplicity, a composite GI tolerance score was produced by averaging the different scores from the eight GI domains.

Figure 3:
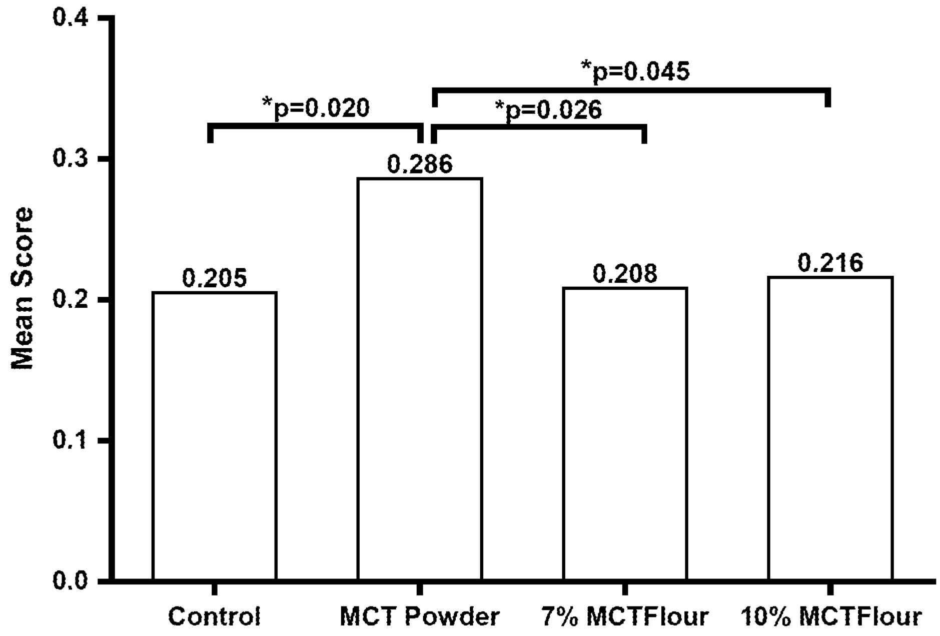
FIG. 3 is a graph from a comparative test that compared gastrointestinal tolerance of baked cake products made using all-purpose flour only, a blended flour composed of all-purpose flour and traditional MCT powder, and two composite plant-MCT flours having different amounts of protein-complexed MCT oil incorporated therein.

The results of the GI tolerance study are set forth in Table 1 and depicted graphically in FIG. 3. The "control" is all-purpose wheat flour

TABLE 1

| | APC Flour (Control) | Blended APC Flour and MCT Powder | Composite APC-MCT (7%) Flour | Composite APC-MCT (10%) Flour |
|---|---|---|---|---|
| Score 0 | 371 | 341 | 352 | 362 |
| Score 1 | 62 | 73 | 58 | 64 |
| Score 2 | 15 | 24 | 12 | 11 |
| Score 3 | 0 | 2 | 2 | 3 |
| Total # of Scores | 448 | 440 | 424 | 440 |

The mean score is the average of all symptom scores in each group all-purpose cake flour (Control), blended all-purpose cake and MCT flour, composite all-purpose cake-MCT (7%) flour, and composite all-purpose cake-MCT (10%) flour. The mean score reflects the occurrence and severity of GI distress, with the subjects evaluating their GI symptoms on the 4-point scale (0=none, 1=mild, 2=moderate, 3=severe). The number of subjects were counted for each score in each group (Table 1), and calculated mean score for each participant in the groups.

FIG. 3 graphically illustrates the mean score for each test group. The mean test scores for participants in each test group were added together and then divided by the total number of subjects for each group to calculate the mean score of each test group. The mean score for each group reflects the overall occurrence and severity of GI distress in the various groups. The higher the mean score, the more frequent and severe the GI distress.

Subjects who consumed cakes made using composite all-purpose cake flour had a mean score of 0.205, which the control mean score.

Subjects who consumed cakes made using blended all-purpose cake flour and MCT powder showed greatest mean score (0.286), which is significantly higher than the other groups ($p<0.05$). This indicates that consuming cakes made using MCT powder caused obvious GI distress.

Subjects who consumed cakes made using composite all-purpose cake-MCT (7%) flour and composite all-purpose cake-MCT (10%) flour had mean scores of 0.208 and 0.216, respectively, which are close to the control group mean scope of 0.205. This indicates that the composite all-purpose cake-MCT flours were generally well tolerated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of manufacturing protein-complexed medium chain triglyceride (MCT) oil, comprising:

forming a wall material slurry comprised of water, protein, at least one of an emulsifier or co-emulsifier, and optionally polysaccharide;

combining liquid MCT oil with the wall material slurry to form a heterogeneous mixture;

subjecting the heterogeneous mixture to shearing to form an emulsion comprised of MCT droplets at least partially encapsulated by and/or complexed with wall material;

subjecting the emulsion to nanolization at a pressure in a range of 40 MPa to 100 MPa to form micro-sized and/or nano-sized composite droplets; and spray-drying the micro-sized and/or nano-sized composite droplets with heated air to remove water by evaporation and form protein-complexed MCT oil comprised of dried protein-complexed MCT oil particles having a particle size of 10 μm or less, wherein the dried protein-complexed MCT oil particles are comprised of MCT oil droplets encapsulated by and/or complexed with a dried wall structure comprised of the protein, at least one of emulsifier or co-emulsifier, and optionally polysaccharide.

2. The method of claim 1, further comprising sieving the dried protein-complexed MCT oil particles to remove larger protein-complexed MCT oil particles to produce sieved protein-complexed MCT oil particles having a more uniform particle size.

3. The method of claim 2, further comprising grinding the larger protein-complexed MCT oil particles removed by sieving.

4. The method of claim 3, further comprising adding the reground protein-complexed MCT oil particles to the sieved protein-complexed MCT oil particles.

5. The method of claim 2, further comprising isolating the removed larger protein-complexed MCT oil particles as a coarser protein-complexed MCT oil product.

6. The method of claim 2, further comprising recycling the removed larger protein-complexed MCT oil particles back to the wall material slurry and/or the heterogeneous mixture.

7. The method of claim 1, wherein the protein comprises one or more of pea protein, hemp protein, pumpkin seed protein, rice protein, soy protein, sunflower seed protein, sacha inchi (*Plukenetia volubilis*) protein, chia protein, quinoa protein, whey protein, casein, egg protein, beef protein, chicken protein, fish protein, or collagen.

8. The method of claim 1, wherein the emulsifier is included and comprises one or more of gum Arabic, acacia fiber, xanthan gum, guar gum, gellan gum, carrageenan, locust bean gum, pectin, starch, soy lecithin, egg lecithin, agar-agar, dextrin, monoglycerides, or diglycerides.

9. The method of claim 1, wherein the co-emulsifier is included and comprises one or more of calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, or sucrose fatty acid ester.

10. The method of claim 1, wherein the polysaccharide is included and comprises one or more of starch, corn starch, potato starch, wheat starch, rice starch, cassava starch, or other polysaccharide selected from pectin, cellulose derivatives, inulin, xylan, arabinoxylan, or chitin.

11. The method of claim 1, wherein the MCT oil comprises one or more of C8 triglyceride, C10 triglyceride, or mixed triglyceride thereof.

12. The method of claim 1, further comprising adding a supplemental oil with the wall material slurry to form the heterogeneous mixture, wherein the supplemental oil is selected from the group consisting of avocado oil, Brazil nut oil, canola oil, corn oil, cottonseed oil, flaxseed oil, grape see oil, hemp seed oil, olive oil, palm oil, peanut oil, rice bran oil, safflower oil (e.g., high oleic), sesame oil, soybean oil, walnut oil, hazelnut oil, sunflower oil, mackerel oil, salmon oil, seabass oil, oyster oil, sardine oil, shrimp oil, krill oil, herring oil, whale oil, halibut oil, rainbow trout oil, tuna oil, cod liver oil, fish oils, butterfat, and combinations thereof.

13. The method of claim 1, wherein the dried protein-complexed MCT oil particles have a particle size or of 5 μm or less, or 1 μm or less, or 500 nm or less, or 250 nm or less, or 100 nm or less.

14. The method of claim 1, further comprising combining the protein-complexed MCT oil with a food to form a food product selected from plant flour, liquid coffee creamer, bubble tea, jelly, ice cream, yogurt, processed meats, pet foods, baked foods, vitamin supplements, energy bars, drink mix, or other protein-complexed MCT oil.

15. The method of claim 14, wherein the food product is a blended plant-MCT flour and the plant flour is selected from the group consisting of:

one or more gluten flours selected from the group consisting of wheat flour, barley flour, rye flour, spelt flour, and triticale flour;

one or more gluten-free flours selected from the group consisting of oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, and quinoa flour; and one or more gluten-free and low carbohydrate seed, nut, or vegetable flours selected from the group consisting of coconut flour, almond flour, peanut flour, sesame flour, sunflower seed flower, hazelnut flour, walnut flour, soy flour, chickpea flour, flaxseed flour, and fava bean flour.

16. A method of manufacturing protein-complexed medium chain triglyceride (MCT) oil, comprising:

forming a wall material slurry comprised of water, protein, at least one of an emulsifier or co-emulsifier, and optionally polysaccharide, wherein:

the protein is selected from the group consisting of pea protein, hemp protein, pumpkin seed protein, rice protein, soy protein, sunflower seed protein, sacha inchi (*Plukenetia volubilis*) protein, chia protein, quinoa protein, whey protein, casein, egg protein, beef protein, chicken protein, fish protein, collagen, and combinations thereof, the emulsifier, when included, is selected from the group consisting of gum Arabic, acacia fiber, xanthan gum, guar gum, gellan gum, carrageenan, locust bean gum, pectin, starch, soy lecithin, egg lecithin, agar-agar, dextrin, monoglyceride, diglyceride, and combinations thereof, and the co-emulsifier, when included, is selected from the group consisting of calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, sucrose fatty acid ester, and combinations thereof;

combining liquid MCT oil with the wall material slurry to form a heterogeneous mixture;

subjecting the heterogeneous mixture to shearing to form an emulsion comprised of MCT droplets at least partially encapsulated by wall material;

subjecting the emulsion to nanolization at a pressure of in a range of 40 MPa to 100 MPa to form micro-sized and/or nano-sized composite droplets; and spray-drying the micro-sized and/or nano-sized composite droplets with heated air to remove water by evaporation and form dried protein-complexed MCT oil particles having a particle size of 10 μm or less, wherein the dried protein-complexed MCT oil particles are comprised of MCT droplets encapsulated by a dried wall structure comprised of the protein, at least one of the emulsifier or co-emulsifier, and optionally polysaccharide.

17. The method of claim 16, wherein the wall material slurry and the wall structure comprise the emulsifier.

18. The method of claim 16, wherein the wall material slurry and the wall structure comprise the co-emulsifier.

19. A method of manufacturing protein-complexed medium chain triglyceride (MCT) oil, comprising:

forming a wall material slurry comprised of water, pea protein, at least one of an emulsifier or co-emulsifier, and optionally polysaccharide;

combining liquid MCT oil with the wall material slurry to form a heterogeneous mixture, wherein the heterogeneous mixture comprises 25% to 50% by weight of the pea protein and 40% to 70% by weight of the liquid MCT oil, excluding the water;

subjecting the heterogeneous mixture to shearing to form an emulsion comprised of MCT droplets at least partially encapsulated by wall material;

subjecting the emulsion to nanolization at a pressure in a range of 40 MPa to 100 MPa to form micro-sized and/or nano-sized composite droplets; and spray-drying the micro-sized and/or nano-sized composite droplets with heated air to remove water by evaporation and form dried protein-complexed MCT oil particles having a particle size of 50 μm or less, wherein the dried protein-complexed MCT oil particles are comprised of MCT droplets encapsulated by a dried wall structure comprised of the protein, at least one of the emulsifier or co-emulsifier, and optionally polysaccharide.

20. The method of claim 19, wherein the wall material slurry and the wall structure comprise the emulsifier and the co-emulsifier, wherein the emulsifier comprises gum Arabic and the co-emulsifier comprises at least one of calcium stearoyl lactylate or sodium stearoyl lactylate.

21. The method of claim 1, wherein the heterogeneous mixture comprises 40% to 70% by weight of the liquid MCT oil and 25% to 50% by weight of the protein, excluding the water.

22. The method of claim 16, wherein the heterogeneous mixture comprises 40% to 70% by weight of the MCT oil and 25% to 50% by weight of the protein, excluding the water.

23. The method of claim 19, wherein the protein-complexed MCT oil includes the MCT oil as the sole oil and omits other oils.

* * * * *